United States Patent
Ebisawa et al.

(10) Patent No.: US 10,671,467 B2
(45) Date of Patent: Jun. 2, 2020

(54) SEMICONDUCTOR DEVICE

(71) Applicant: Renesas Electronics Corporation, Tokyo (JP)

(72) Inventors: Kazuhito Ebisawa, Tokyo (JP); Yukihiro Kishida, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 215 days.

(21) Appl. No.: 15/828,713

(22) Filed: Dec. 1, 2017

(65) Prior Publication Data
US 2018/0181457 A1   Jun. 28, 2018

(30) Foreign Application Priority Data
Dec. 27, 2016   (JP) .................................. 2016-253405

(51) Int. Cl.
*G06F 11/00* (2006.01)
*G06F 11/07* (2006.01)
*G06F 11/26* (2006.01)

(52) U.S. Cl.
CPC ........ *G06F 11/0757* (2013.01); *G06F 11/079* (2013.01); *G06F 11/0721* (2013.01); *G06F 11/0772* (2013.01); *G06F 11/261* (2013.01)

(58) Field of Classification Search
CPC ............. G06F 11/0787; G06F 11/0772; G06F 11/0721; G06F 11/079
See application file for complete search history.

(56) References Cited

U.S. PATENT DOCUMENTS

| 8,909,997 | B2* | 12/2014 | Fuchigami | G06F 11/0721 714/55 |
| 8,996,927 | B2 | 3/2015 | Yoshikawa et al. | |
| 9,234,941 | B2 | 1/2016 | Iwagami et al. | |
| 2003/0079163 | A1* | 4/2003 | Hashimoto | G06F 11/0721 714/55 |
| 2006/0064284 | A1 | 3/2006 | Ueno et al. | |

(Continued)

FOREIGN PATENT DOCUMENTS

JP    2010-087959 A    4/2010
JP    2011-175607 A    9/2011
(Continued)

OTHER PUBLICATIONS

Communication dated Mar. 6, 2018, from European Patent Office in counterpart to application No. 17207204.3.
(Continued)

*Primary Examiner* — Philip Guyton
(74) *Attorney, Agent, or Firm* — McDermott Will & Emery LLP

(57) ABSTRACT

The aim of the present disclosure is to provide a watchdog timer that can perform a fault diagnosis during the actual use of a semiconductor device. In a semiconductor device provided with a watchdog timer, the watchdog timer includes a counter; a counter control circuit that changes a count value of the counter to a desired value in the refresh period of the count value; and a fault diagnosis module. The fault diagnosis module includes a suppressing circuit that suppresses generation of a reset signal to the exterior of the watchdog timer in the refresh period; and a holding circuit that holds the reset signal.

11 Claims, 9 Drawing Sheets

(56) References Cited

U.S. PATENT DOCUMENTS

2013/0067287 A1\* 3/2013 Yoshikawa ......... G06F 11/0757
714/47.1
2013/0231807 A1 9/2013 Yoshikawa et al.

FOREIGN PATENT DOCUMENTS

JP 2013-061863 A 4/2013
JP 2014-238348 A 12/2014

OTHER PUBLICATIONS

Japanese Notice of Reasons for Refusal issued in corresponding Japanese Patent Application No. 2016-253405, dated Mar. 3, 2020, with English translation.

\* cited by examiner

SEMICONDUCTOR DEVICE

CROSS-REFERENCE TO RELATED APPLICATIONS

The disclosure of Japanese Patent Application No. 2016-253405 filed on Dec. 27, 2016 including the specification, drawings, and abstract is incorporated herein by reference in its entirety.

BACKGROUND

The present disclosure relates to a semiconductor device and is applicable to a semiconductor device including a watchdog timer.

Patent Literature 1 discloses the following. That is, a semiconductor device includes a watchdog timer, a central processing unit, and a mode terminal. The central processing unit controls the time-out control of the watchdog timer. The watchdog timer is supplied, from the exterior via the mode terminal, with the instructions to make a timer period of the watchdog timer shorter than the cycle specified by the time-out control of the central processing unit. In response to the instructions, the watchdog timer detects a time-out before the time-out control by the central processing unit.

(Patent Literature 1) Japanese Unexamined Patent Application Publication No. 2010-87959

SUMMARY

In evaluating the watchdog timer, the disclosure of Patent Document 1 provides the technology of evaluating the watchdog timer after setting the semiconductor device as an evaluation mode; accordingly, the technology cannot be applied during the actual operation of the semiconductor device. Therefore, the disclosure of Patent Document 1 may present issues especially in the viewpoint of the functional safety of a semiconductor device used in a vehicle.

The aim of the present disclosure is to provide a semiconductor device that includes a watchdog timer capable of performing fault diagnosis during the actual operation of the semiconductor device.

The other issues and new features of the present disclosure will become clear from the description of the present specification and the accompanying drawings.

The following explains briefly the outline of a typical embodiment of the present disclosure.

In a semiconductor device including a watchdog timer, the watchdog timer includes a counter; a counter control circuit that changes a count value of the counter to a desired value in the refresh period of the count value; and a fault diagnosis module. The fault diagnosis module includes a suppressing circuit that suppresses generation of a reset signal to the exterior of the watchdog timer in the refresh period; and a holding circuit that holds the reset signal.

According to the semiconductor device, it is possible to perform fault diagnosis of the watchdog timer during the actual operation of the semiconductor device.

DETAILED DESCRIPTION

Figure 1:
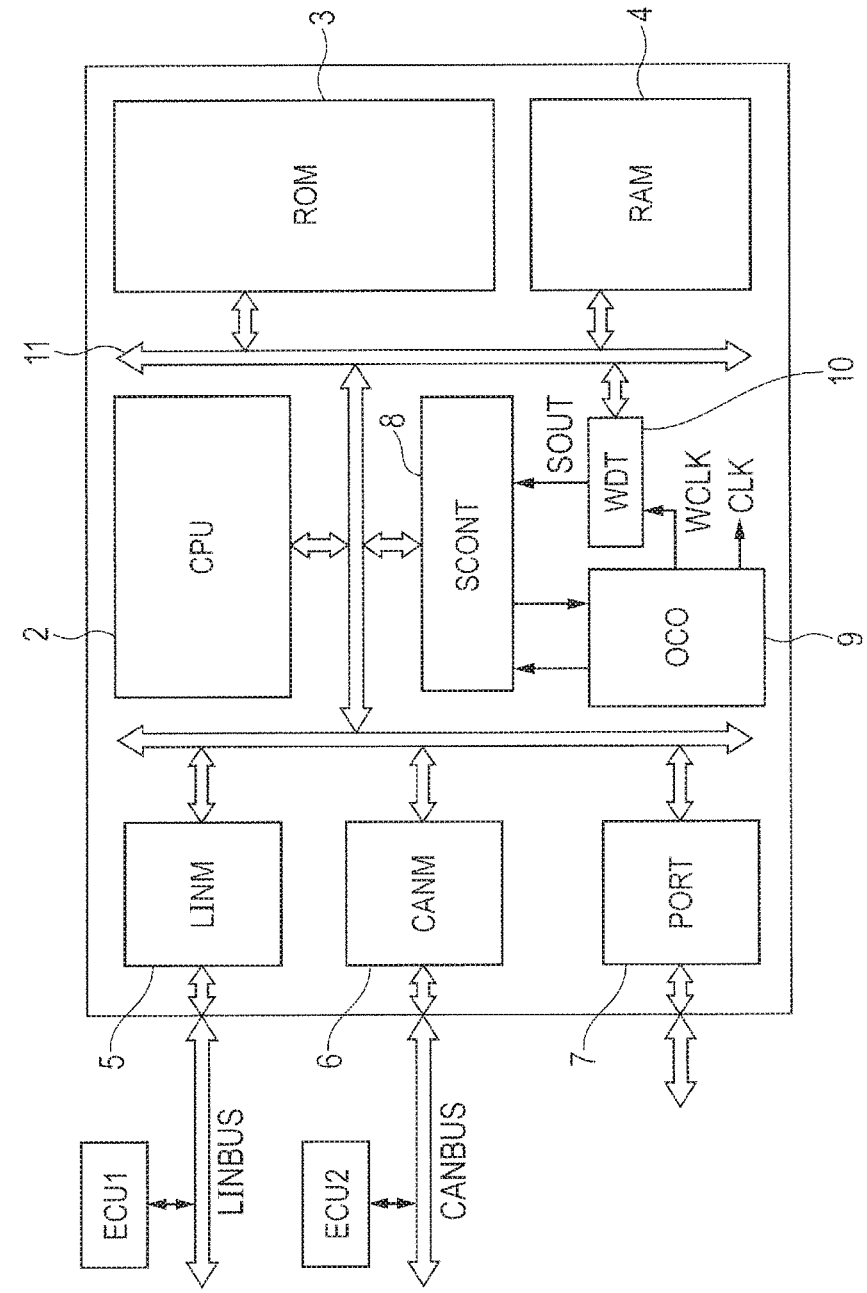
FIG. 1 is a block diagram illustrating a semiconductor device according to Embodiment.

Hereinafter, Embodiment is described with reference to the attached drawings. In the following explanation, the same symbol or reference numeral is attached to the same element and the repeated explanation thereof may be omitted.

Embodiment (Configuration of a Semiconductor Device)

FIG. 1 is a block diagram illustrating the semiconductor device according to Embodiment. FIG. 1 illustrates a block diagram of the semiconductor device 1 provided with a watchdog timer (WDT) 10. The semiconductor device 1 is an in-vehicle control microcomputer and is formed as one semiconductor chip.

The microcomputer 1 includes a central processing unit (CPU) 2 that runs a program, a ROM (Read Only Memory) 3 that stores the program, and a RAM (Random Access Memory) 4 that serves as a work space of the central processing unit 2.

The microcomputer 1 includes an LIN module (LINM) 5 serving as an interface circuit to an LIN (Local Interconnect Network), which is one of the vehicle-installed networks coupled externally, via an LIN bus LINBUS. The microcomputer 1 includes a CAN module (CANM) 6 serving as an interface circuit to a CAN (Controller Area Network), which is the other of the vehicle-installed networks coupled externally, via a CAN bus CANBUS. Electronic control units (ECU1, ECU2) for vehicle control are coupled to each of the LINBUS and the CANBUS.

The microcomputer 1 further includes a port (PORT) 7 that performs externally input-output of information via an external terminal (not shown), a system control circuit (SCNT) 8, a clock generating circuit (OCO) 9, a watchdog timer (WDT) 10, and an internal bus 11. The internal bus 11 couples each of units (2, 3, 4, 5, 6, 7, 8, 10) in the microcomputer 1 mutually.

The system control circuit (SCNT) 8 controls the operation mode of the system and the initialization of the system. The system control circuit (SCNT) 8 is coupled to the clock generating circuit (OCO) 9. The system control circuit (SCNT) 8 sets up the clock generating circuit (OCO) 9 and confirms the setup.

The clock generating circuit (OCO) 9 supplies a clock signal CLK to each of the units (2, 3, 4, 5, 6, 7, 8) of the microcomputer 1. During the actual operation of the microcomputer 1, the central processing unit 2 executes the program stored in the ROM 3 synchronizing with the clock signal CLK. The clock generating circuit (OCO) 9 generates a clock signal WCLK serving as a count source clock for the watchdog timer 10. The clock generating circuit (OCO) 9 may contain an exclusive-use clock generating circuit (WDTOCO) for generating the clock signal WCLK.

The watchdog timer 10 detects errors such as an endless loop and an overrun of the central processing unit 2 that occur due to the design error of the program to be executed by the central processing unit 2, by counting the clock signal WCLK during the actual operation of the microcomputer 1.

The watchdog timer 10 is a timer that counts the clock signal WCLK toward a value (an overflow value OVFV of the counter value) set up in advance by the central processing unit 2, and detects an overflow when the counted value reaches the set-up value. The watchdog timer 10 initializes (refreshes) the counted value periodically by the program executed by the central processing unit 2, in order to suppress the overflow. Therefore, when the central processing unit 2 executes the program normally, the value counted by the watchdog timer 10 will not overflow. On the other hand, when the central processing unit 2 runs away out of control, the value counted by the watchdog timer 10 is not initialized (not refreshed). Accordingly, an overflow is detected by the watchdog timer 10. This specification explains the detection of an overflow. However, it may be changed to the detection of an underflow. In this case, the underflow is detected by performing countdown from a value set up in advance by the central processing unit 2.

As described later, the watchdog timer 10 generates multiple output signals SOUT, such as a reset signal 60, an interrupt signal 61, and a fault detection signal 62, to the system control circuit (SCNT) 8.

(A Configuration of the Watchdog Timer)

Figure 2:
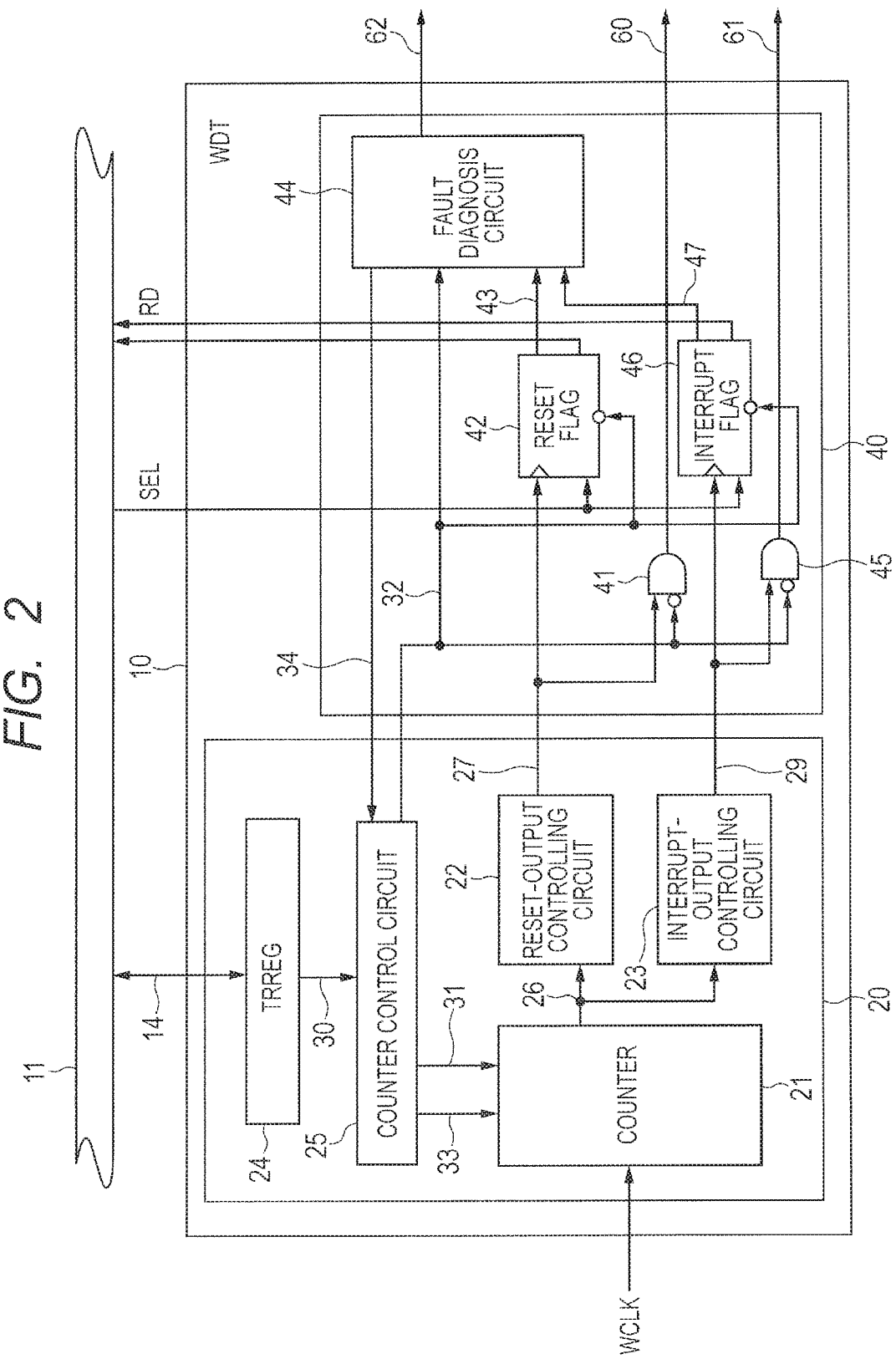
FIG. 2 is a drawing illustrating a configuration of a watchdog timer according to Embodiment.

FIG. 2 illustrates a configuration of the watchdog timer according to Embodiment. The watchdog timer (WDT) 10 includes a watchdog timer circuit unit (watchdog timer module) 20 and a fault diagnosis circuit unit (fault diagnosis module) 40.

The watchdog timer module 20 includes a counter 21, a reset-output controlling circuit 22, an interrupt-output controlling circuit 23, a trigger register 24, and a counter control circuit 25.

The counter 21 counts up the count source clock WCLK, and outputs a count value 26. The reset-output controlling circuit 22 controls the output of an internal reset signal 27, and outputs the internal reset signal 27 when it is detected that the count value 26 of the counter 21 has reached the value (an overflow value OVFV) set up in advance and has overflowed. When the internal reset signal 27 is not masked (disabled) by an AND circuit (a first AND circuit) 41 to be described later, the internal reset signal 27 is outputted to the system control circuit 8 as a reset signal 60.

The interrupt-output controlling circuit 23 controls the output of an internal interrupt signal 29, and asserts the internal interrupt signal 29 when it is detected that the count value 26 of the counter 21 has reached a specific count value INTV (for example, a value of 50% or 75% of the overflow value OVFV). When the internal interrupt signal 29 is not masked (disabled) by an AND circuit (a second AND circuit) 45 to be described later, the internal interrupt signal 29 is outputted to the system control circuit 8 as an interrupt signal 61.

The trigger register (TRREG) 24 is coupled to the internal bus 11 via a signal wiring 14, and the central processing unit 2 performs read and write of the register value of the trigger register (TRREG) 24. The central processing unit 2 writes a predetermined first value (for example, a predetermined first fixed value) in the trigger register 24 for the suppression of an overflow, that is, for the initialization (refresh) of the count value of the watchdog timer 10. Accordingly, the trigger register 24 asserts a trigger signal 30.

The counter control circuit 25 controls the initializing operation of the count value 26 of the counter 21, that is, the refresh operation of the count value 26. Triggered by the assertion of the trigger signal 30, the counter control circuit 25 asserts a write signal (a first write signal) 31 that instructs write of a pre-overflow count value (BOVF), and writes the pre-overflow count value (BOVF) directly to the counter 21. Concurrently, the counter control circuit 25 outputs a write status signal (a first write status signal) 32 indicative of the write state of the pre-overflow count value.

The counter control circuit 25 also has the function to control the initialization of the count value. In this case, the counter control circuit 25 asserts a refresh signal 33 for instructing the initialization (refresh) of the counter value. The assertion of the refresh signal 33 is triggered by a reset-output normal signal 34 outputted from the fault diagnosis module 40.

Assuming that the overflow value (OVFV) of the count value is 11111111 (binary notation) in an 8-bit counter with which the counter 21 performs a count-up operation, the pre-overflow count value (BOVF) is 11110011 (binary notation) or 11110111 (binary notation), for example. That is, the pre-overflow count value (BOVF) is a value from which the clock signal WCLK is counted up by several clocks before reaching the overflow value (OVFV). Although the pre-overflow count value (BOVF) is arbitrary, it is preferably determined in consideration of the length of the refresh period to be described later. Assuming the underflow value of the count value is 00000000 (binary notation) in the 8-bit counter with which the counter 21 performs a count-down operation, a pre-underflow count value is 000001000 (binary notation) or 00000111 (binary notation). That is, the pre-underflow count value is a value from which the clock signal WCLK is counted down by several clocks before reaching the underflow value.

The fault diagnosis module 40 diagnoses the fault of the watchdog timer module 20. The fault diagnosis module 40 includes the AND circuit (the first AND circuit) 41, a reset flag circuit (a first holding circuit) 42, the AND circuit (the second AND circuit) 45, and an interrupt flag circuit (a second holding circuit) 46. The reset flag circuit 42 is a holding circuit (a first holding circuit) that detects assertion of the internal reset signal 27 and holds it as a reset flag. The interrupt flag circuit 46 is a holding circuit (a second holding circuit) that detects assertion of the internal interrupt signal 29 and holds it as an interrupt flag.

First, explanation is made for the case where the write status signal (the first write status signal) 32 of the pre-overflow value is asserted. In this case, the internal reset signal 27 is suppressed (masked) by the AND circuit (the first AND circuit) 41. Therefore, the reset signal 60 is prevented from being issued to the system control circuit 8. Instead, the reset flag circuit (the first holding circuit) 42 has the function as a holding circuit that detects assertion of the internal reset signal 27 and holds it as a reset flag. The reset flag circuit 42 asserts a reset flag signal 43 and notifies it to a fault diagnosis circuit 44.

The internal interrupt signal 29 is suppressed (masked) by the AND circuit (the second AND circuit) 45. Therefore, the interrupt signal 61 is prevented from being issued to the system control circuit 8. Instead, the interrupt flag circuit (the second holding circuit) 46 has the function as a holding circuit that detects assertion of the internal interrupt signal 29 and holds it as an interrupt flag. The interrupt flag circuit 46 asserts an interrupt flag signal 47 and notifies it to the fault diagnosis circuit 44.

Responding to the assertion of the reset flag signal 43, the fault diagnosis circuit 44 asserts the reset-output normal signal 34 indicative of the normal output of the internal reset signal 27. When the reset flag signal 43 is not asserted, the fault diagnosis circuit 44 asserts a fault detection signal 62, and gives a warning to the system control circuit 8. Consequently, the system control circuit 8 generates a system reset signal, and instructs the reset operation of the entire system of the microcomputer 1, for example.

Next, explanation is made for the case where the write status signal (the first write status signal) 32 of the pre-overflow value is negated. In this case, the AND circuit 41 does not suppress (does not mask) the internal reset signal 27. Therefore, the reset signal 60 is issued to the system control circuit 8. In this case, the reset flag circuit 42 is reset by the negation of the write status signal (the first write status signal) 32 of the pre-overflow value.

The reset flag circuit 42 and the interrupt flag circuit 46 are selected by a selection signal SEL supplied via the internal bus 11. When the CPU 2 generates the selection signal SEL to select the reset flag circuit 42 and the interrupt flag circuit 46, the reset flag signal 43 held in the reset flag circuit 42 and the interrupt flag signal 47 held in the interrupt flag circuit 46 are acquired by the CPU 2 via the internal bus 11 as read data RD. It is possible to confirm the signal state of the reset flag signal 43 and the interrupt flag signal 47. Therefore, the failure analysis of the watchdog timer (WDT) 10 can be performed easily.

(The Operation Flow According to Embodiment)

Figure 3:
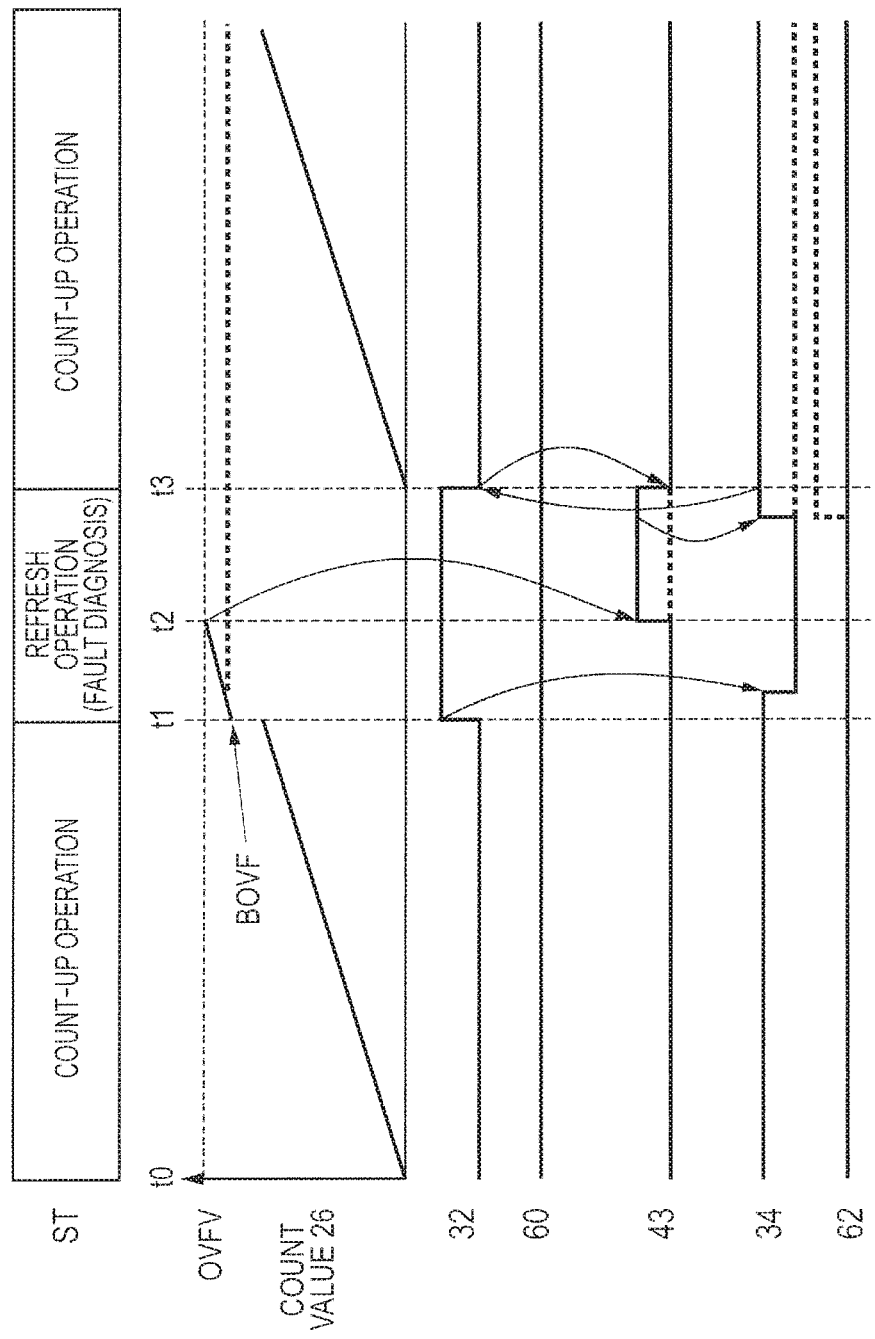
FIG. 3 is a drawing illustrating an operation flow in a normal operation and in a reset-output fault of the watchdog timer according to Embodiment.

FIG. 3 illustrates an operation flow in a normal operation and in a reset-output fault of the watchdog timer according to Embodiment. The signals illustrated in FIG. 3 correspond to the signals illustrated in FIG. 2. A status ST indicates the state of the watchdog timer module 20 and the fault diagnosis module 40. The counter value 26 expresses schematically a state where the counter 21 performs the count-up. The OVFV expresses the overflow value of the count value. In FIG. 3, the solid line indicates the state at the time of the normal operation, and the thick dotted line indicates the state at the time of the reset-output fault.

First, the status ST is explained. As shown in the status ST, the period from Time t0 to Time t1 is a period of the count-up operation of the watchdog timer module 20, and the period from Time t1 to Time t3 is a period of the refresh operation of the watchdog timer module 20 and a period of the fault diagnosis operation of the fault diagnosis module 40. The period after Time t3 is a period of the count-up operation of the watchdog timer module 20. It is assumed that in the period of the count-up operation during the actual operation of the watchdog timer 10, the counter 21 performs the count-up operation.

<In the Case of a Normal Operation>

At Time t1, the write of the desired fixed value to the trigger register 24 is performed by executing a program by the CPU 2 during the actual operation of the watchdog timer 10. This write acts as a trigger to start the refresh operation. First, the write signal (the first write signal) 31 of the pre-overflow value is asserted by the counter control circuit 25, and the pre-overflow value (BOVF) is written in the counter 21. Concurrently, the write status signal (the first write status signal) 32 of the pre-overflow value is asserted at a high level. Accordingly, the reset-output normal signal 34 is cleared to a low level by the fault diagnosis circuit 44.

At Time t2, the count value of the counter 21 reaches the overflow value (OVFV) after several counts of the count source clock WCLK and overflows. Due to the overflow, the internal reset signal 27 is issued by the reset-output controlling circuit 22. However, the internal reset signal 27 is masked by the AND circuit (the first AND circuit) 41 in the fault diagnosis module 40, and the reset signal 60 maintains a low level. Therefore, the reset signal 60 is not issued to the system control circuit 8. Instead, the reset flag circuit 42 is set and the reset flag signal 43 is asserted at a high level.

Next, the fault diagnosis circuit 44 confirms whether the reset flag circuit 42 has been asserted at a high level within a certain predetermined period after the write status signal (the first write status signal) 32 of the pre-overflow value has been asserted, by means of the reset flag signal 43. When the reset flag signal 43 is set to a high level (solid line), the fault diagnosis circuit 44 diagnoses the reset output as the normal operation, and asserts the reset-output normal signal 34 at a high level.

At Time t3, responding to the assertion of the reset-output normal signal 34, the counter control circuit 25 initializes (refreshes) the counter 21, and makes the next count-up operation start. At the same time, the counter control circuit 25 negates the write status signal (the first write status signal) 32 of the pre-overflow value (BOVF) at a low level. Accordingly, the reset flag signal 43 is cleared to a low level.

<In the Case of a Reset Fault>

At Time t1, a pre-overflow value (BOVF) is written in the counter 21. Concurrently, the write status signal (the first write status signal) 32 of the pre-overflow value is asserted at a high level. Accordingly, the reset-output normal signal 34 is cleared to a low level by the fault diagnosis circuit 44.

It is assumed that the counter 21 fails to operate properly after this for example, and the count value does not reach the overflow value (thick dotted line). In this case, the reset flag signal 43 remains cleared at a low level (thick dotted line in the period from Time t2 to Time t3). Therefore, it is regarded as the fault in which the reset signal is not generated. Therefore, the fault diagnosis circuit 44 diagnoses as the failure of a circuit in the path of generating the reset signal, keeps the reset-output normal signal 34 at a low level, asserts the fault detection signal 62 at a high level, and gives a warning to the system control circuit 8. In the above, the example of the failure in the counter 21 is explained. However, the failure in which a reset signal is not generated can be failures in the reset-output controlling circuit 22 or the reset flag circuit 42.

<In the Case of an Overrun>

Figure 4:
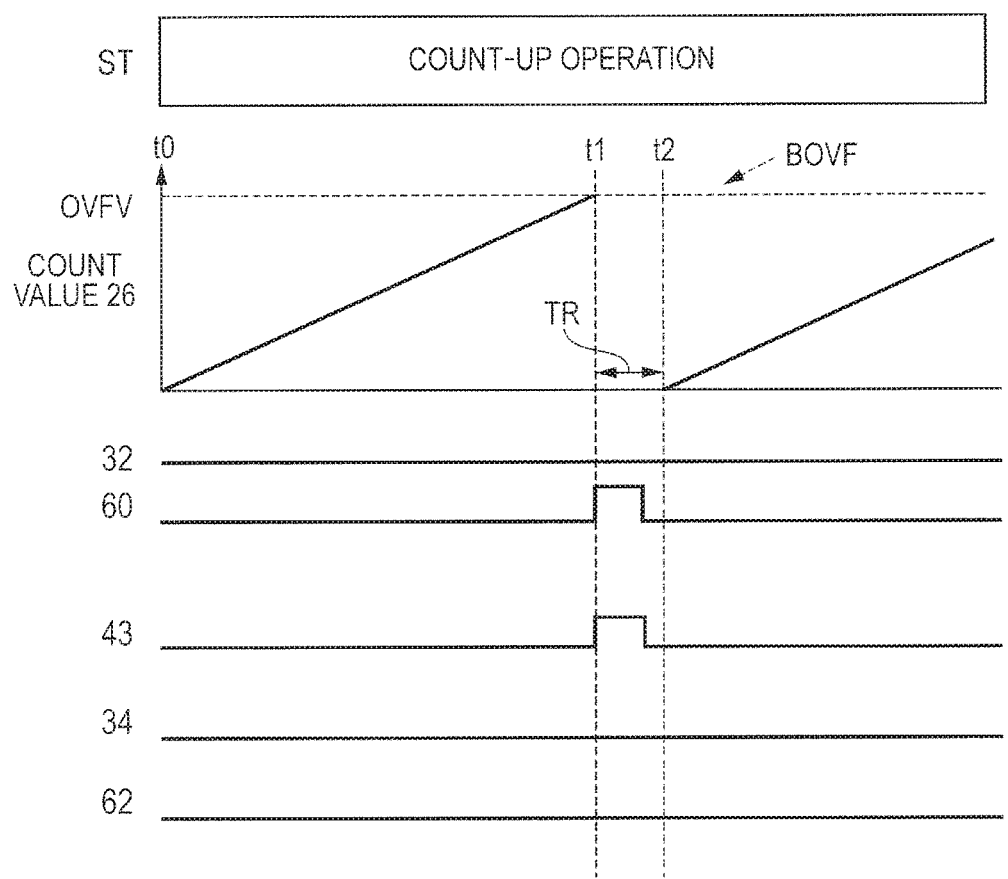
FIG. 4 is a drawing illustrating an operation flow in an overflow of the watchdog timer according to Embodiment.

FIG. 4 illustrates an operation flow in an overflow of the watchdog timer according to Embodiment. In FIG. 4, the timing of write of the pre-overflow value (BOVF) is indicated by dotted lines for comparison with FIG. 3.

FIG. 4 illustrates the case where the counter 21 starts the count-up operation at Time t0 and the count value of the counter 21 reaches the overflow at Time t1. When put in another way, in this case, the CPU 2 cannot write the predetermined first fixed value to the trigger register 24 due to an overrun of the program, for example, and the count value of the counter 21 overflows before the refresh operation is performed. In this case, the reset-output controlling circuit 22 asserts the internal reset signal 27 at a high level, because of the overflow. However, the trigger signal 30 is not asserted, accordingly, the counter control circuit 25 keeps negating the write status signal (the first write status signal) 32 of the pre-overflow value at a low level. Therefore, the internal reset signal 27 is not masked by the AND circuit (the first AND circuit) 41, and is issued to the system control circuit 8 as the asserted reset signal 60. Consequently, the system control circuit 8 generates the system reset signal, for example, and the reset operation of the entire system of the microcomputer 1 is performed. At Time t2 after the reset period TR, the microcomputer 1 is reset and started, and the count-up operation of the counter 21 is started.

According to Embodiment, the counter control circuit 25 that writes the pre-overflow value (BOVF) into the counter 21 is provided in the watchdog timer (WDT) 10. The counter control circuit 25 writes the pre-overflow value (BOVF) to the counter 21 at the time of the refresh operation during the actual operation of the watchdog timer (WDT) 10. Therefore, in the period of the refresh operation, it is possible to overflow intentionally the count value 26 of the counter 21 to generate the internal reset signal 27. Accordingly, it is possible to diagnose the fault of the circuit that generates the reset signal.

The internal reset signal 27 that is generated in the period of the refresh operation is masked by the AND circuit 41. Therefore, the reset signal 60 to the system control circuit 8 is not generated. It is devised such that the internal reset signal 27 can be detected and held, by use of the reset flag circuit 42.

According to the device described above, during the program execution by the CPU 2, it is possible to perform the self-diagnosis (the reset-output fault detection) of the watchdog timer (WDT) 10, in the period of the refresh operation during the actual operation of the watchdog timer (WDT) 10. The self-diagnosis of the watchdog timer (WDT) 10 can be performed during the actual operation of the watchdog timer (WDT) 10, without hindering the detection of the overrun of the program.

It is possible to realize the self-diagnosis of the watchdog timer (WDT) 10 by employing a simple circuit configuration as illustrated in FIG. 2. Therefore, it is possible to perform the fault diagnosis of the circuit part that generates the reset signal in the watchdog timer (WDT) 10, without enlarging the circuit scale like a redundancy configuration (in which multiple watchdog timers are provided and their operations are compared).

Modified Example 1

Figure 5:
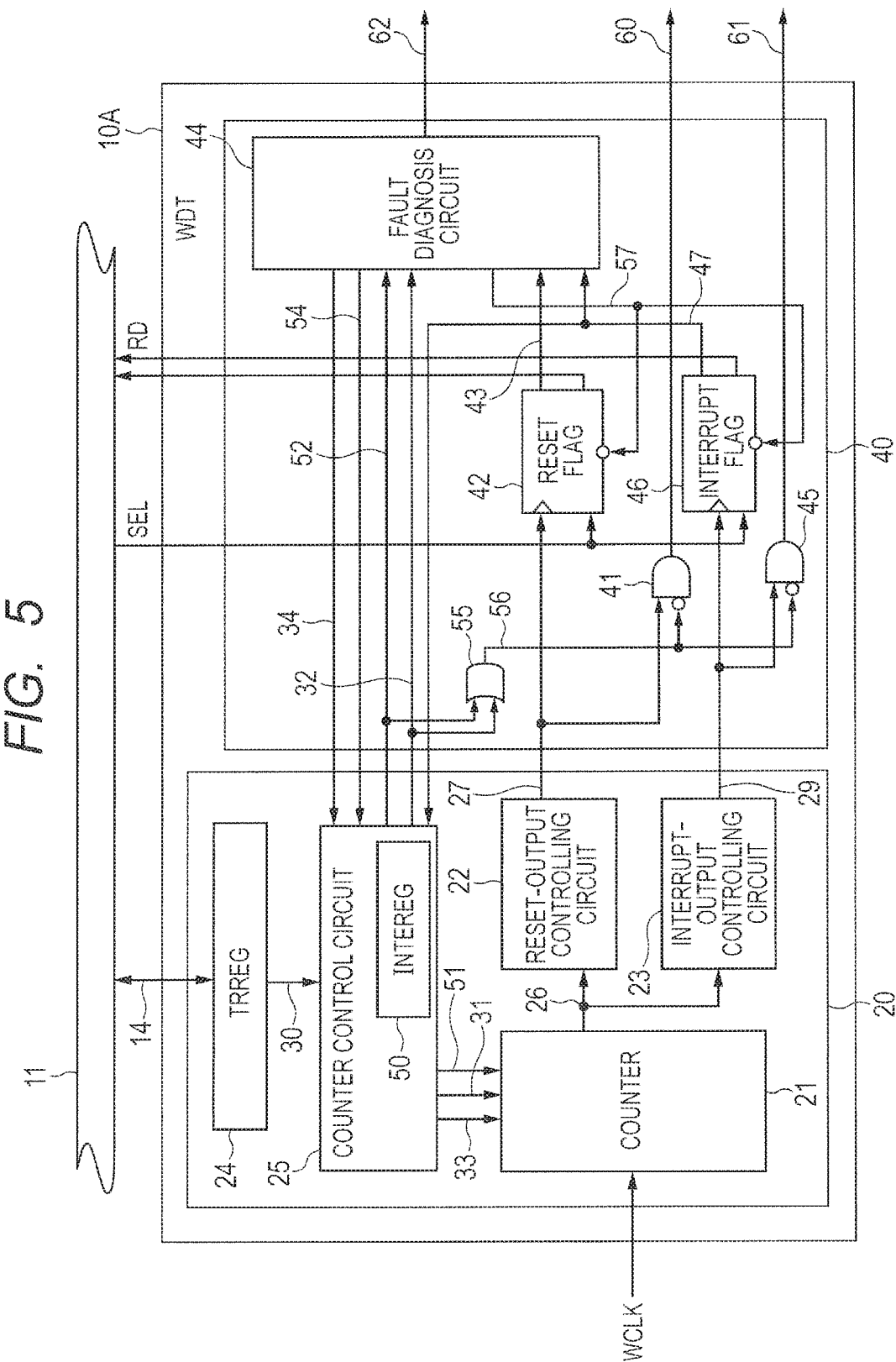
FIG. 5 is a drawing illustrating a configuration of a watchdog timer according to Modified Example 1.

FIG. 5 illustrates a configuration of a watchdog timer according to Modified Example 1. A watchdog timer 10A illustrated in FIG. 5 is a modified example of the watchdog timer 10 illustrated in FIG. 2.

The watchdog timer 10 illustrated in FIG. 2 is explained regarding the fault detection of the circuit in the generation path of the reset signal. However, the watchdog timer 10A illustrated in FIG. 5 enables the fault detection of the circuit in the generation path of the reset signal and the fault detection of the circuit in the generation path of the interrupt signal as well.

The following explanation is made with regard to a different portion from the watchdog timer 10 illustrated in FIG. 2.

The counter control circuit 25 further includes a control register (an interrupt enable register INTEREG) 50 that controls whether to enable or to disenable the generation of an interrupt signal. The counter control circuit 25 further outputs a write signal (a second write signal) 51 of the pre-interrupt value (BINT) to the counter 21, outputs a write status signal (a second write status signal) 52 of the pre-interrupt value (BINT) to the fault diagnosis circuit 44, and receives an interrupt flag signal 47 from the interrupt flag circuit 46. The interrupt flag signal 47 received by the counter control circuit 25 is utilized for determining whether the operation flow of the watchdog timer 10A is the operation flow 1 according to the modified example 1 illustrated in FIG. 6, or the operation flow 2 according to the modified example 1 illustrated in FIG. 7.

The fault diagnosis circuit 44 further outputs the interrupt-output normal signal 54 to the counter control circuit 25, and outputs the flag initializing signal 57 to each reset input of the reset flag circuit 42 and the interrupt flag circuit 46. An OR circuit 55 is provided, and a signal 56 of the logical addition (OR) of the write status signal (the first write signal) 32 of the pre-overflow value and the write status signal (the second write status signal) 52 of the pre-interrupt value (BINT) is inputted into each input terminal of the AND circuit (the first AND circuit) 41 and the AND circuit (the second AND circuit) 45.

When the register value of the interrupt enable register (INTEREG) 50 is set as data "1", the interrupt-output controlling circuit 23 detects the fact that the count value 26 of the counter 21 is a specific count value INTV (for example, a value 75% of the overflow value OVFV) and outputs the internal interrupt signal 29. When the register value of the INTEREG 50 is set as data "0", the interrupt-output controlling circuit 23 does not generate the internal interrupt signal 29.

The following explains an example of the operation of the CPU 2 when the register value of the interrupt enable register (INTEREG) 50 is set as data "1." An example of the operation of the CPU 2 explained in the following corresponds to the operation flow illustrated in FIG. 6 to be described later, and the first refresh operation of the counter value 26 is performed before the generation of the internal interrupt signal 29. On the other hand, the other example of the operation of the CPU 2 is related to the operation flow illustrated in FIG. 7 to be described later. In the operation flow illustrated in FIG. 7, the second refresh operation of the counter value 26 is performed after the generation of the internal interrupt signal 29 and the interrupt signal 61.

The central processing unit 2 that executes a program writes a predetermined second value (for example, a predetermined second fixed value) in the trigger register 24, before the count value 26 reaches the interrupt count value (INTV) that specifies the generation of the internal interrupt signal 29, that is, for the purpose of initializing (refreshing) the count value 26. Accordingly, the trigger register 24 asserts the trigger signal 30.

Triggered by the assertion of the trigger signal 30, the counter control circuit 25 asserts the write signal (the second write signal) 51 to instruct the write of the pre-interrupt value (BINT) to the counter 21, and changes the count value 26 to the pre-interrupt value (BINT) by writing the pre-interrupt value (BINT) directly to the counter 21. Concurrently, the counter control circuit 25 asserts the write status signal (the second write status signal) 52 indicative of the write status of the pre-interrupt value, and notifies it to the fault diagnosis circuit 44.

In the refresh period (the first refresh operation), the counter 21 continues the count from the pre-interrupt value (BINT), and when the count value 26 reaches the interrupt count value (INTV), the interrupt-output controlling circuit 23 detect the fact and asserts the internal interrupt signal 29.

When the write status signal (the second write status signal) 52 of the pre-interrupt value (BINT) is asserted, the internal interrupt signal 29 is suppressed (masked) by the AND circuit (the second AND circuit) 45. Therefore, the issue of the interrupt signal 61 to the system control circuit 8 is prevented. Instead, the interrupt flag circuit 46 detects the assertion of the internal interrupt signal 29, and holds it as the interrupt flag signal 47. The interrupt flag circuit 46 asserts an interrupt flag signal 47 and notifies it to the fault diagnosis circuit 44. Responding to the assertion of the interrupt flag signal 47, the fault diagnosis circuit 44 asserts the interrupt-output normal signal 54 indicative of the normal output of the internal interruption signal 29. On the other hand, when the interrupt flag signal 47 is not asserted, the fault diagnosis circuit 44 asserts the fault detection signal 62, and gives a warning to the system control circuit 8. Accordingly, the fault detection of the circuit in the interrupt signal path is performed.

When the write status signal (the second write status signal) 52 of the pre-interrupt value (BINT) is negated, the internal interrupt signal 29 is issued as the asserted interrupt signal 61 to the system control circuit 8, without being masked by the AND circuit 45.

After the count value 26 reaches the interrupt count value (INTV), the count-up operation of the counter 21 is continued. However, the count value 26 is set as the pre-overflow value (BOVF) by the assertion of the interrupt-output normal signal 54. Concurrently with this, the write status signal (the second write status signal) 52 of the pre-interrupt value (BINT) is cleared (negated), and the write status signal (the first write status signal) 32 of the pre-overflow value is asserted. Hereinafter, the refresh operation as in FIG. 3 and the explanation thereof is performed (referred to as the refresh operation 2 in FIG. 6 and FIG. 7 to be described later). Accordingly, the fault detection of the circuit in the generation path of the reset signal is performed.

When the register value of the interrupt enable register (INTEREG) 50 is set as data "1", the count value 26 is changed to the pre-interrupt value (BINT) by the write of the predetermined second value (for example, the predetermined second fixed value) to the trigger register 24 as described above. However, the change is not restricted to this. The write to the trigger register 24 by the central processing unit 2 is performed for the predetermined first value (for example, the predetermined first fixed value), and at the point in time of the generation of the trigger signal 30, the write value to the count value 26 can be changed by the counter control circuit 25 determining whether the interrupt flag circuit 46 holds the asserted interrupt flag signal 47 or not. For example, when the interrupt flag circuit 46 does not hold the asserted interrupt flag signal 47, the counter control circuit 25 changes the count value 26 to the pre-interrupt value (BINT) (refer to FIG. 6). When the interrupt flag circuit 46 holds the asserted interrupt flag signal 47 on the other hand, the counter control circuit 25 changes the count value 26 to the pre-overflow value (BOVF) (refer to FIG. 7).

(Operation Flow 1 According to Modified Example 1)

Figure 6:
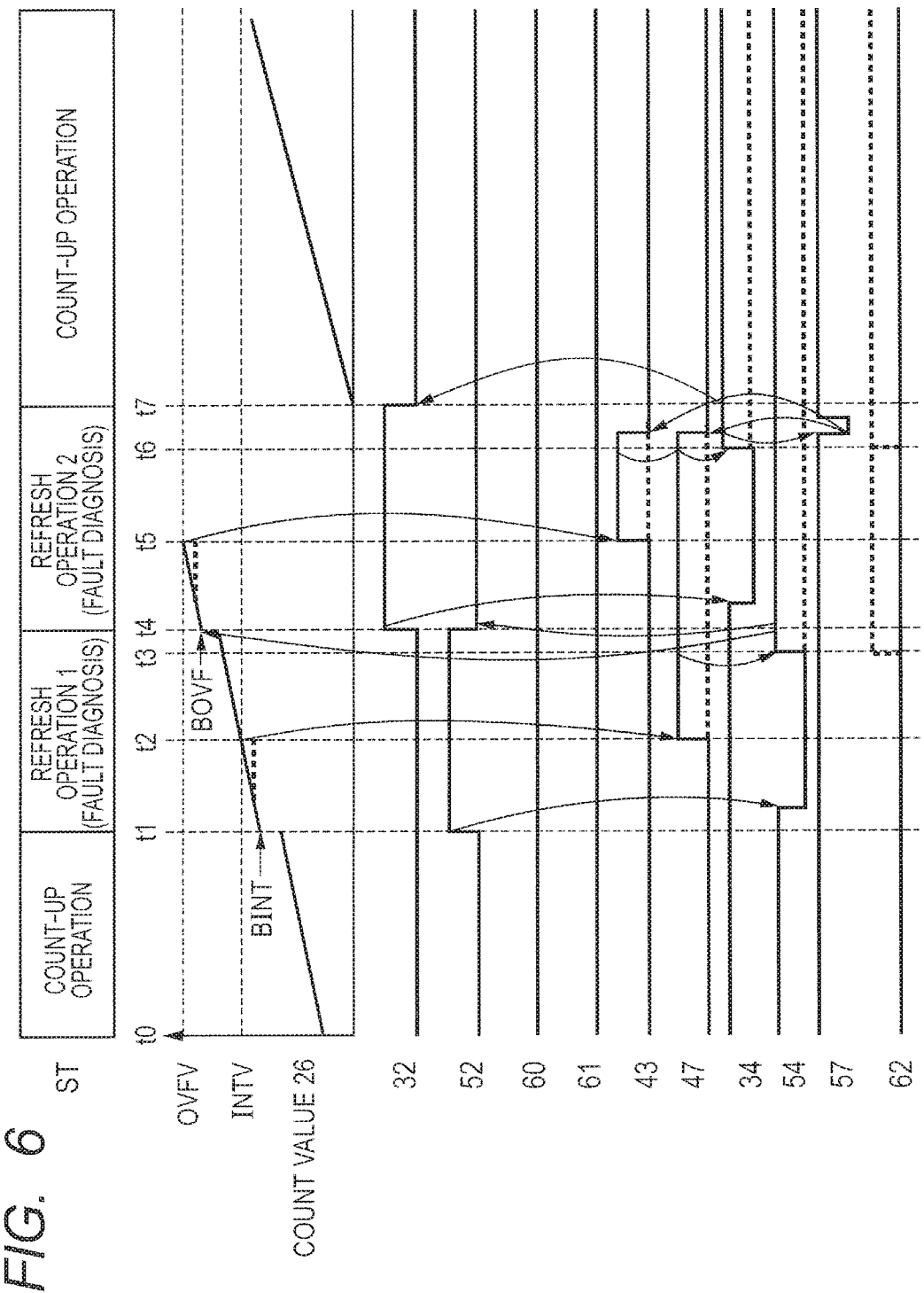
FIG. 6 is a drawing illustrating an operation flow in a normal operation and in a reset fault and an interrupt fault of the watchdog timer according to Modified Example 1.

FIG. 6 illustrates an operation flow in a normal operation and in a reset fault and an interrupt fault of the watchdog timer, according to Modified Example 1. The operation flow illustrated in FIG. 6 assumes that the register value of the interrupt enable register 50 is set as data "1" and that the operation is to generate the interrupt signal 61 and the reset signal 60 from the watchdog timer 10A, and correspond to the case where the refresh operation 1 is performed before the generation of the internal interrupt signal 29.

The signals illustrated in FIG. 6 correspond to the signals illustrated in FIG. 5, respectively. In FIG. 6, the solid line indicates the state at the time of the normal operation, and the thick dotted line indicates the state at the time of the reset fault and the interrupt fault. The status ST indicates the state of the watchdog timer module 20 and the fault diagnosis module 40. The counter value 26 expresses schematically a state where the counter 21 performs the count-up operation. OVFV indicates the overflow count value that specifies an overflow, and INTV indicates the interrupt count value that specifies the generation of the internal interrupt signal 29.

<In the Case of a Normal Operation>

First, the status ST is explained. As shown in the status ST, the period from Time t0 to Time t1 is a period of the count-up operation of the watchdog timer module 20, and the period from Time t1 to Time t4 is a period of the first refresh operation (referred to as a refresh operation 1) of the watchdog timer module 20, and a period of operation of the fault diagnosis regarding the interruption of the fault diagnosis module 40. The period from Time t4 to Time t7 is a period of the second refresh operation (referred to as a refresh operation 2) of the watchdog timer module 20, and a period of operation of the fault diagnosis regarding the reset of the fault diagnosis module 40. The period after Time t7 is a period of the count-up operation of the watchdog timer module 20. In the period of the count-up operation during the actual operation of the watchdog timer 10A, the counter 21 is assumed to perform the count-up operation.

At Time t1, during the actual operation of the watchdog timer 10, the CPU 2 that executes a program writes the predetermined second value (the predetermined second fixed value) to the trigger register 24 before the interruption is issued. Triggered by this, the trigger signal 30 is asserted and inputted to the counter control circuit 25. Responding to the assertion of the trigger signal 30, the counter control circuit 25 refers to the value of the interrupt flag signal 47. In this case, the value of the interrupt flag signal 47 is the "0" cleared state, and the refresh operation 1 is started.

First, the write signal (the second write signal) 51 of the pre-interrupt value is asserted by the counter control circuit 25, and the pre-interrupt value (BINT) is written in the counter 21. Concurrently, the write status signal (the second write status signal) 52 of the pre-interrupt value is asserted. Accordingly, the interrupt-output normal signal 54 is cleared.

At Time t2, the counter value 26 reaches the value of interrupt issue (INTV) after several clocks of the count source clock WCLK. The interrupt-output controlling circuit 23 detects the fact and issues the internal interrupt signal 29. On the other hand, the AND circuit 45 in the fault diagnosis module 40 masks the signal. Therefore, the fact does not reach the interrupt signal 61 and the issue of the interrupt signal 61 to the system control circuit 8 is prevented. Instead, the interrupt flag circuit 46 is set and the interrupt flag signal 47 is asserted.

At Time t3, the fault diagnosis circuit 44 confirms, through the interrupt flag signal 47, whether the interrupt flag circuit 46 is set within a certain period after the write status signal (the second write status signal) 52 of the pre-interrupt value is asserted. When the interrupt flag circuit 46 is set (solid lines), the fault diagnosis circuit 44 diagnoses as the normal operation, and asserts the interrupt-output normal signal 54, and subsequently, negates the write status signal (the second write status signal) 52 of the pre-interruption value. On the other hand, when the interrupt flag circuit 46 is cleared and not set (thick dotted lines), the fault diagnosis circuit 44 diagnoses as the interrupt fault, asserts the fault detection signal 62, and gives a warning to the system control circuit 8.

After Time t4, an operation similar to the refresh operation (fault diagnosis) in the period from Time t1 to Time t3 in the operation flow illustrated in FIG. 3 is performed.

However, the write of the pre-overflow value (BOVF) to the counter 21 at Time t1 in the operation flow illustrated in FIG. 3 is not triggered by the user program, but it is changed to be triggered by the assertion of the interrupt-output normal signal 54 outputted from the fault diagnosis circuit 44 as shown at Time t4 illustrated in FIG. 6. Furthermore, the set of the reset-output normal signal 34 at Time t3 in the operation flow illustrated in FIG. 3 is changed to confirm not only the reset flag signal 43 but also the interrupt flag signal 47 as shown at Time t6 illustrated in FIG. 6, and to diagnose whether it is normal operation or not by the fault diagnosis circuit 44. In the case of normal operation, the fault diagnosis circuit 44 asserts the reset-output normal signal 34, and negates the write status signal (the first write status signal) 32 of the pre-overflow value. At the same time, the fault diagnosis circuit 44 outputs a one-shot-pulse flag initializing signal 57 to clear the reset flag circuit 42 and the interrupt flag circuit 46.

<In the Case of a Reset Fault and an Interrupt Fault>

In the case of an interrupt fault at Time t1, the pre-interrupt value (BINT) is written in the counter 21. Concurrently, the write status signal (the second write status signal) 52 of the pre-interrupt value is asserted at a high level. Thereby, the interrupt-output normal signal 54 is cleared at a low level by the fault diagnosis circuit 44.

It is assumed that the counter 21 fails to operate properly after this for example, and the count value 26 does not reach the interrupt count value (INTV) (thick dotted line). In this case, the interrupt flag signal 47 remains cleared at a low level (thick dotted line). Therefore, it is regarded as the failure in which the interrupt flag signal 47 is not generated. Therefore, the fault diagnosis circuit 44 diagnoses as the failure of a circuit in the generation path of the interrupt signal, keeps the interrupt-output normal signal 54 at a low level, asserts the fault detection signal 62 at a high level, and gives a warning to the system control circuit 8. In the above, the example of the failure in the counter 21 is explained. However, the failure in which an interrupt signal is not generated can be failures in the interrupt-output controlling circuit 23 or the interrupt flag circuit 46.

In the case of a reset fault, at Time t4, the pre-overflow value (BOVF) is written in the counter 21. Concurrently, the write status signal (the first write status signal) 32 of the pre-overflow value is asserted at a high level. Thereby, the reset-output normal signal 34 is cleared at a low level by the fault diagnosis circuit 44.

It is assumed that the counter 21 fails to operate properly after this for example, and the count value does not reach the overflow value (thick dotted line). In this case, the reset flag signal 43 remains cleared at a low level. Therefore, it is regarded as the fault in which the reset signal is not generated. Therefore, the fault diagnosis circuit 44 diagnoses as the failure of a circuit in the generation path of the reset signal, keeps the reset-output normal signal 34 at a low level, asserts the fault detection signal 62 at a high level, and gives a warning to the system control circuit 8. In the above, the example of the failure in the counter 21 is explained. However, the failure in which a reset signal is not generated can be failures in the reset-output controlling circuit 22 or the reset flag circuit 42.

<In the Case of an Overrun>

In the case where the CPU 2 cannot write the predetermined second fixed value to the trigger register 24 due to an overrun of the program for example, and the count value of the counter 21 overflows before the refresh operation 1 is performed, the write status signal (the second write status signal) 52 of the pre-interrupt value and the write status signal (the first write status signal) 32 of the pre-overflow value remain negated. Therefore, the AND circuit 45 does not mask the internal interrupt signal 29 generated by the interrupt-output controlling circuit 23 and the AND circuit 41 does not mask the internal reset signal 27 generated by the reset-output controlling circuit 22. Therefore, the interrupt signal 61 and the reset signal 60 are notified to the system control circuit 8. The system control circuit 8 performs predetermined preparation processing (saving process, etc.) in response to the interrupt signal 61, and generates a system reset signal in response to the reset signal 60, for example.

(Operation Flow 2 According to Modified Example 1)

Figure 7:
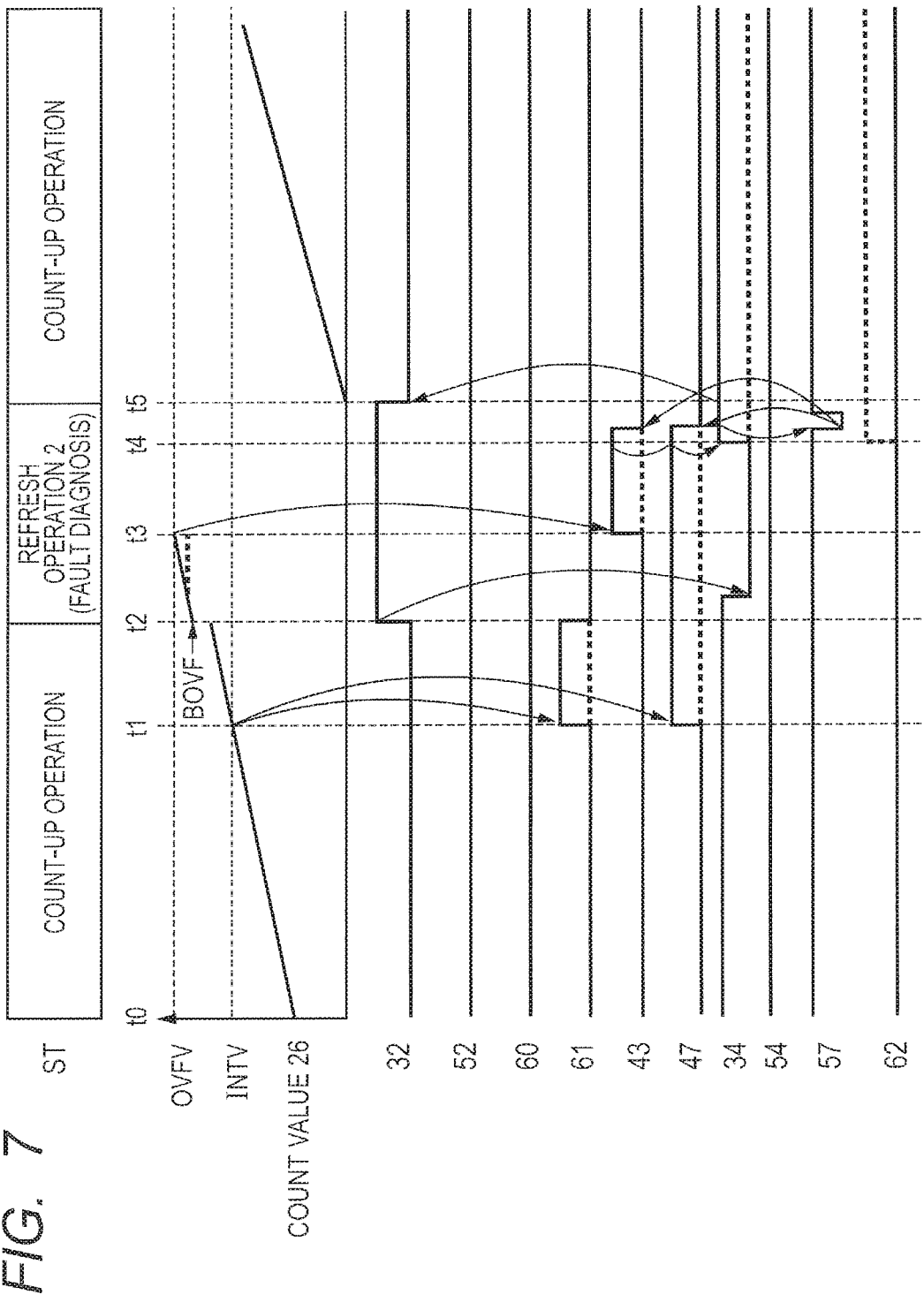
FIG. 7 is a drawing illustrating another operation flow in the normal operation and in a reset fault and an interrupt fault of the watchdog timer according to Modified Example 1.

FIG. 7 illustrates another operation flow in the normal operation and in a reset fault and an interrupt fault of the watchdog timer according to Modified Example 1. The operation flow illustrated in FIG. 7 assumes that the register value of the interrupt enable register 50 is set as data "1" and that the operation is to generate the interrupt signal 61 and the reset signal 60 from the watchdog timer 10A. Furthermore, the operation flow illustrated in FIG. 7 corresponds to the case where the refresh operation 2 is performed after the generation of the internal interrupt signal 29, that is, the case where the refresh operation 1 illustrated in FIG. 6 is not performed.

<In the Case of a Normal Operation>

At Time t1, the count value 26 of the counter 21 reaches the value of interrupt issue (INTV). The interrupt-output controlling circuit 23 detects the fact and issues the internal interrupt signal 29. Accordingly, the interrupt flag circuit 46 is set and the interrupt flag signal 47 is generated. The write status signal (the second write status signal) 52 of the pre-interrupt value is negated. Therefore, the AND circuit (the second AND circuit) 45 does not mask the internal interrupt signal 29 generated by the interrupt-output controlling circuit 23. Accordingly, the interrupt signal 61 is notified to the system control circuit 8. Receiving the interrupt signal 61, the system control circuit 8 instructs the CPU 2 to perform the interruption processing according to the interrupt signal 61. This interruption processing is the processing of write of the predetermined first value (the predetermined first fixed value) to the trigger register 24, for example.

At Time t2, the CPU 2 writes the predetermined first value (the predetermined first fixed value) to the trigger register 24. Triggered by this, the trigger signal 30 is asserted and supplied to the counter control circuit 25.

Responding to the assertion of the trigger signal 30, the counter control circuit 25 refers to the value of the interrupt flag signal 47. In this case, the value of the interrupt flag signal 47 is set as the data "1", the refresh operation 1 is skipped, and the refresh operation 2 is started. As is the case described above, the counter control circuit 25 rewrites the count value 26 of the counter 21 to the pre-overflow value (BOVF). Concurrently with this, the write status signal (the first write status signal) 32 of the pre-overflow value is asserted, and the reset-output normal signal 34 is cleared.

At Time t3, the count value of the counter 21 reaches the overflow value (OVFV) after several counts of the count source clock WCLK, and overflows. Due to the overflow, the internal reset signal 27 is issued by the reset-output controlling circuit 22. However, the internal reset signal 27 is masked by the AND circuit (the first AND circuit) 41. Therefore, the reset signal 60 maintains a low level. Therefore, the reset signal 60 is not issued to the system control circuit 8. Instead, the reset flag circuit 42 is set and the reset flag signal 43 is asserted at a high level.

At Time t4, the fault diagnosis circuit 44 confirms, through the reset flag signal 43 and the interrupt flag signal 47, whether the reset flag circuit 42 and the interrupt flag circuit 46 are asserted at a high level, within a certain predetermined period after the write status signal (the first write status signal) 32 of the pre-overflow value is asserted. When the reset flag signal 43 and the interrupt flag signal 47 are set at a high level (solid line), the fault diagnosis circuit 44 diagnoses as the normal operation, asserts the reset-output normal signal 34, and outputs the one-shot-pulse reset initializing signal 57 to clear the reset flag circuit 42 and the interrupt flag circuit 46.

At Time t5, the fault diagnosis circuit 44 negates the write status signal (the first write status signal) 32 of the pre-overflow value. In response to the assertion of the reset-output normal signal 34, the counter control circuit 25 asserts the refresh signal 33, initializes (refreshes) the count value 26 of the counter 21, and starts the next count-up operation.

<In the Case of a Reset Fault or an Interrupt Fault>

The period from Time t2 to Time t5, that is, the period of the refresh operation 2, is a period of operation of the fault diagnosis by the fault diagnosis module 40. In this period, when the reset flag circuit 42 and/or the interrupt flag circuit 46 are not set at a high level (thick dotted line), the fault diagnosis circuit 44 diagnoses as a reset fault and/or an interrupt fault, asserts the fault detection signal 62, and gives a warning to the system control circuit 8. Accordingly, the fault detection of the circuit in the generation path of the reset signal and the fault detection of the circuit in the interrupt signal path are performed.

According to Modified Example 1, the counter control circuit 25, which writes the pre-interrupt value (BINT) and the pre-overflow value (BOVF) in the counter 21, is provided in the watchdog timer (WDT) 10. The counter control circuit 25 writes the pre-interrupt value (BINT) and the pre-overflow value (BOVF) in the counter 21 at the time of the refresh operation (refresh operation 1, refresh operation 2) during the actual operation of the watchdog timer (WDT) 10. Therefore, in the period of the refresh operation, the count value of the counter 21 is made to reach intentionally the count value (INTV) at which an overflow (OVFV) and an interrupt occur, to generate the internal interrupt signal 29 and the internal reset signal 27. Therefore, it is possible to diagnoses the failure of the circuit to generate the interrupt signal and the failure of the circuit to generate the reset signal.

The internal interrupt signal 29 and the internal reset signal 27 that are generated in the period of the refresh operation are masked by the AND circuit (the second AND circuit) 45 and the AND circuit (the first AND circuit) 41. Therefore, the interrupt signal 61 and the reset signal 60 to the system control circuit 8 are not generated. It is devised such that the internal interrupt signal 29 and the internal reset signal 27 are detected and held by the interrupt flag circuit 46 and the reset flag circuit 42, respectively.

According to the device described above, during the program execution by the CPU 2, it is possible to perform the self-diagnosis (the reset-output fault detection, the interrupt-output fault detection) of the watchdog timer (WDT) 10A, in the period of the refresh operation during the actual operation of the watchdog timer (WDT) 10A. The self-diagnosis of the watchdog timer (WDT) 10A can be performed during the actual operation of the watchdog timer (WDT) 10A, without hindering the detection of the overrun of the program.

It is possible to realize the self-diagnosis of the watchdog timer (WDT) 10A by employing a simple circuit configuration as illustrated in FIG. 5. Therefore, it is possible to perform the fault diagnosis of the circuit part that generates the reset signal in the watchdog timer (WDT) 10A, without enlarging the circuit scale like a redundancy configuration (in which multiple watchdog timers are provided and their operations are compared).

Modified Example 2

Figure 8:
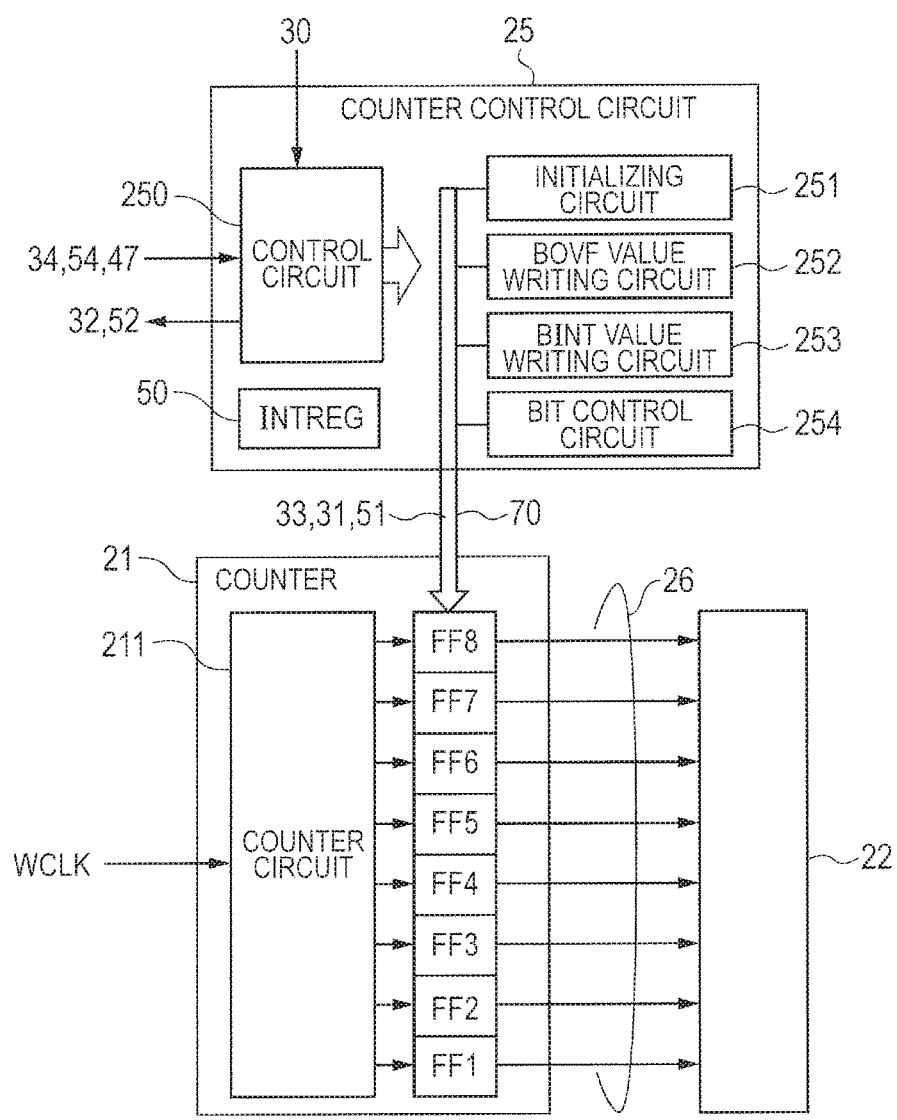
FIG. 8 is a drawing illustrating the counter control circuit according to Modified Example 2.

FIG. 8 illustrates the counter control circuit according to Modified Example 2. The counter control circuit 25 illustrated in FIG. 8 is a modified example of the counter control circuit 25 according to Embodiment illustrated in FIG. 2 and Modified Example 1 illustrated in FIG. 5. The configuration according to Embodiment and Modified Example 1 is also described.

The counter control circuit 25 includes a control circuit 250 and an interrupt enable register (INTEREG) 50. The control circuit 250 is supplied with a trigger signal 30 and control signals (34, 54, 47) from the trigger register 24, outputs control signals (the first write status signal 32, the second write status signal 52), and controls the whole operation of the counter control circuit 25. The control signals (34, 54, 47, 32, 52) are labeled with the same number as the signals of Embodiment illustrated in FIG. 2 and Modified Example 1 illustrated in FIG. 5.

The counter control circuit 25 further includes an initializing circuit 251, a BOVF value writing circuit 252, a BINT value writing circuit 253, and a bit control circuit 254. The initializing circuit 251 initializes the value of the output circuit (FF1-FF8) that stores and outputs the count value 26 of a counter circuit 211 in the counter 21. The BOVF value writing circuit 252 rewrites the value of the output circuit (FF1-FF8) to the pre-overflow value (BOVF). The BINT value writing circuit 253 rewrites the value of the output circuit (FF1-FF8) to the pre-interrupt value (BINT). The outputs of the initializing circuit 251, the BOVF value writing circuit 252, and the BINT value writing circuit 253 are supplied to the output circuit (FF1-FF8) as signals 33, 31, and 51, respectively. The signals 33, 31, and 51 are labeled with the same number of the signals of Embodiment illustrated in FIG. 2 and Modified Example illustrated in FIG. 5.

The bit control circuit 254 is configured so as to write "1" and "0" freely to the value of each flip-flop FF of the output circuit (FF1-FF8) and to perform the fault detection for all the bits of the output circuit (FF1-FF8). In this case, the bit control circuit 254 generates a control signal 70 to the output circuit (FF1-FF8) and changes the value of each flip-flop FF into the desired value.

The control circuit 250 has the function to select one circuit in order to make it operate, among the initializing circuit 251, the BOVF value writing circuit 252, the BINT value writing circuit 253, and the bit control circuit 254.

Figure 9:
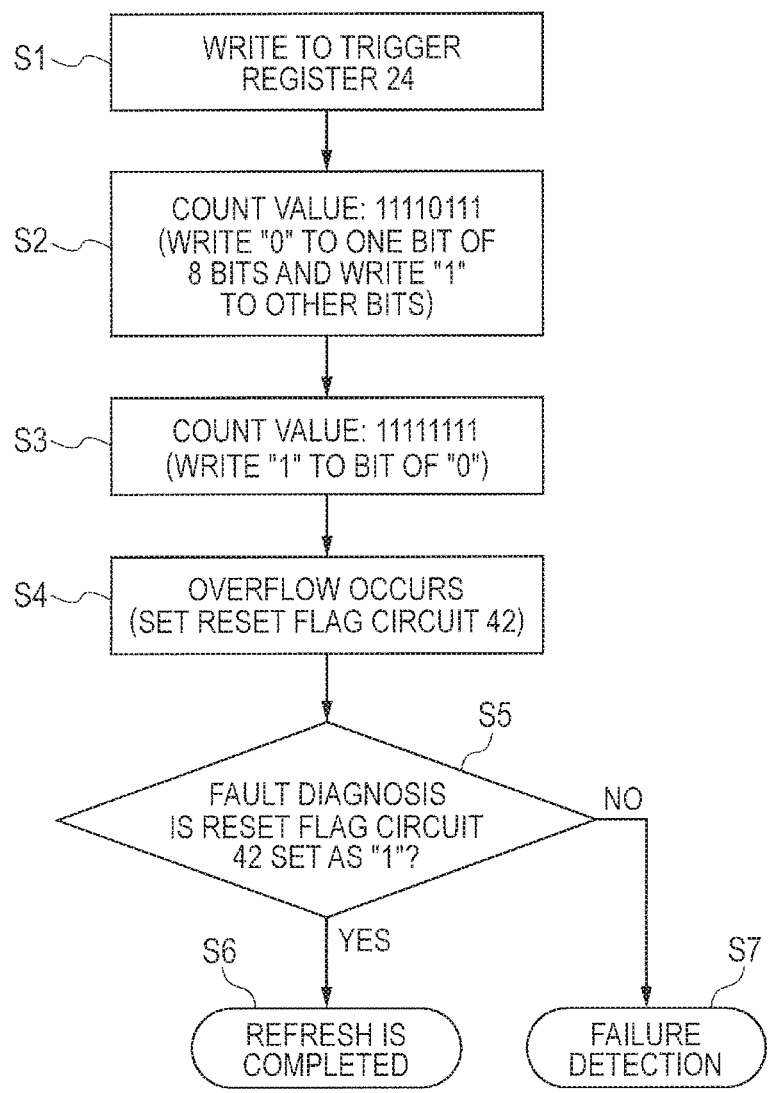
FIG. 9 is a flow chart illustrating an operation of a bit control circuit.

FIG. 9 is a flow chart illustrating an operation of the bit control circuit.

At Step S1, a predetermined fixed value is written in the trigger register 24 by the CPU 2 that executes a program. Triggered by this, the refresh operation is started.

At Step S2, the bit control circuit 254 writes a count value like 11110111 in the output circuit (FF1-FF8) of the counter 21. The count value to be written has "0" at one bit and "1" at all the other bits.

At Step S3, the bit control circuit 254 rewrites the bit of "0" to the bit of "1", among the count value like 11110111.

At Step S4, an overflow is generated and the reset flag circuit 42 is set.

At Step S5, the fault diagnosis circuit 44 performs the fault diagnosis by confirming whether the reset flag circuit 42 is set as "1", by use of the reset flag signal 43. When the reset flag circuit 42 is set as "1", the flow shifts to Step S6, and the refresh is completed. When the reset flag circuit 42 is not set as "1" and remains cleared, the flow shifts to Step S7, and the fault diagnosis circuit 44 determines it as the failure, asserts the fault detection signal 62, and gives a warning to the system control circuit 8.

Whenever the refresh operation is started, Step S2 to Step S5 are repeatedly executed to a different FF among FF1 to FF8 of the output circuit of the counter 21. Accordingly, it is possible to perform the fault detection of all the circuits FF1 to FF8.

In Embodiment and Modified Example 1, it is only possible to detect the abnormalities of the counter 21 from immediately before the overflow to the overflow, among the abnormalities of the counter 21. That is, abnormalities of only several lower-order bits can be detected among the abnormalities of the counter 21. As opposed to this, in Modified Example 2, it is possible to detect the fault for all the bits of the counter 21, by changing the refresh operation of Embodiment or Modified Example 1 to the operation as described above.

As described above, the invention accomplished by the present inventors has been concretely explained based on Embodiment and Modified Examples. However, it cannot be overemphasized that the present invention is not restricted to Embodiment and Modified Examples as described above, and it can be changed variously in the range that does not deviate from the gist.

For example, the counter 21 may be divided into a reset counter and an interrupt counter. Then, a reset-specific count source clock may be supplied to the reset counter, and an interrupt-specific count source clock may be supplied to the interrupt counter. Here, the frequency of the reset-specific count source clock and the frequency of the interrupt-specific count source clock are set as different frequencies. According to such a configuration, it is possible to adjust finely the generating time of the interruption and the generating time of the reset.

What is claimed is:

1. A semiconductor device comprising:
a watchdog timer,
wherein the watchdog timer comprises:
a counter;
a reset-output controlling circuit to output an internal reset signal when detecting that a count value of the counter has reached an overflow value;
a counter control circuit to change, in a refresh period, a count value of the counter to a value immediately preceding the overflow value, which is a pre-overflow count value, and to output a write status signal indicative of a write state of the pre-overflow count value; and
a fault diagnosis module, and
wherein the fault diagnosis module comprises:
a suppressing circuit to suppress, when the write status signal is asserted, the internal reset signal from the reset-output controlling circuit, thereby suppressing generation of a reset signal to the exterior of the watchdog timer in the refresh period; and
a first holding circuit to hold, when the write status signal is asserted, the internal reset signal from the reset-output controlling circuit as a reset flag, and to assert a reset flag signal and notifies it to a fault diagnosis circuit,
wherein the fault diagnosis circuit outputs, when the write status signal is asserted and the reset flag signal is not asserted, a fault detection signal.

2. The semiconductor device according to claim 1 further comprising:
a CPU; and
an internal bus,
wherein the watchdog timer further comprises:
a trigger register,
wherein the trigger register generates a trigger signal to the counter control circuit when a predetermined value is written by the CPU via the internal bus, and
wherein the counter control circuit changes the count value of the counter to the pre-overflow count value in the refresh period according to the trigger signal.

3. The semiconductor device according to claim 2,
wherein the first holding circuit is coupled to the internal bus under control of a selection signal supplied by the CPU.

4. The semiconductor device according to claim 1,
wherein the watchdog timer further comprises:
an interrupt-output controlling circuit to output an interrupt signal when detecting that a count value of the counter has reached an overflow value;
wherein the fault diagnosis module further comprises:
an interrupt suppressing circuit to suppress, when the write status signal is asserted, the interrupt signal from the interrupt-output controlling circuit, thereby suppressing the generation of an interrupt signal to the exterior of the watchdog timer in the refresh period; and
a second holding circuit to hold, when the write status signal is asserted, the interrupt signal as an interrupt flag.

5. The semiconductor device according to claim 4,
wherein the fault diagnosis circuit generates a fault detection signal when the write status signal is asserted and the interrupt flag is not held.

6. The semiconductor device according to claim 1,
wherein the counter comprises:
an output circuit to output the count value, and
wherein the counter control circuit comprises:
a bit control circuit to change the value of the output circuit in the refresh period.

7. A semiconductor device comprising:
a watchdog timer,
wherein the watchdog timer comprises:
a counter;
an interrupt-output controlling circuit to output an interrupt signal when detecting that a count value of the counter has reached an overflow value;
a counter control circuit to change, in a refresh period, a count value of the counter to a value immediately preceding the overflow value, which is a pre-overflow count value, and to output a write status signal indicative of a write state of the pre-overflow count value; and
a fault diagnosis module,
wherein the fault diagnosis module comprises:
a suppressing circuit to suppress, when the write status signal is asserted, the interrupt signal from the interrupt-output controlling circuit, thereby suppressing generation of an interrupt signal to the exterior of the watchdog timer in the refresh period; and a first holding circuit to hold, when the write status signal is asserted, the interrupt signal from the interrupt-output controlling circuit as an interrupt flag and to assert an interrupt flag signal and notifies it to a fault diagnosis circuit, wherein the fault diagnosis circuit outputs, when the write status signal is asserted and the interrupt flag signal is not asserted, a fault detection signal.

8. The semiconductor device according to claim 7 further comprising:

a CPU;

and an internal bus, wherein the watchdog timer further comprises:

a trigger register, wherein the trigger register generates a trigger signal to the counter control circuit when a predetermined value is written by the CPU via the internal bus, and wherein the counter control circuit changes the count value of the counter to the pre-overflow count value in the refresh period according to the trigger signal.

9. The semiconductor device according to claim 8, wherein the first holding circuit is coupled to the internal bus under control of a selection signal supplied by the CPU.

10. The semiconductor device according to claim 7, wherein the watchdog timer further comprises:

a reset-output controlling circuit to output an internal reset signal when detecting that a count value of the counter has reached an overflow value;

wherein the fault diagnosis module further comprises:

a reset suppressing circuit to suppress, when the write status signal is asserted, the internal reset signal from the reset-output controlling circuit, thereby suppressing generation of a reset signal to the exterior of the watchdog timer in the refresh period; and a second holding circuit to hold, when the write status signal is asserted, the internal reset signal as a reset signal.

11. The semiconductor device according to claim 10, wherein the fault diagnosis circuit generates a fault detection signal when the write status signal is asserted and the reset flag is not held.

* * * * *